(12) United States Patent
Cantrell

(10) Patent No.: US 9,967,725 B2
(45) Date of Patent: May 8, 2018

(54) CALL 911 THE APP

(71) Applicant: Rebecca Handy Cantrell, Santa Barbara, CA (US)

(72) Inventor: Rebecca Handy Cantrell, Santa Barbara, CA (US)

( * ) Notice: Subject to any disclaimer, the term of this patent is extended or adjusted under 35 U.S.C. 154(b) by 0 days. days.

(21) Appl. No.: 15/711,792

(22) Filed: Sep. 21, 2017

(65) Prior Publication Data

US 2018/0049011 A1     Feb. 15, 2018

Related U.S. Application Data

(63) Continuation-in-part of application No. 15/236,231, filed on Aug. 12, 2016, now abandoned.

(60) Provisional application No. 62/204,784, filed on Aug. 13, 2015.

(51) Int. Cl.

| H04M 11/04 | (2006.01) |
|---|---|
| H04W 4/22 | (2009.01) |
| H04W 76/00 | (2018.01) |
| H04W 4/12 | (2009.01) |
| H04W 4/02 | (2018.01) |
| G06F 3/0482 | (2013.01) |

(52) U.S. Cl.
CPC ............. *H04W 4/22* (2013.01); *H04W 4/02* (2013.01); *H04W 4/12* (2013.01); *H04W 76/007* (2013.01); *G06F 3/0482* (2013.01); *H04M 2242/30* (2013.01)

(58) Field of Classification Search
CPC ....................................................... H04W 4/22
USPC .......................................... 455/404.1, 404.2
See application file for complete search history.

(56) References Cited

U.S. PATENT DOCUMENTS

2011/0319051 A1* 12/2011 Reitnour ................. G01S 19/17
                                                                    455/404.2
2012/0329420 A1* 12/2012 Zotti ................. H04M 1/72541
                                                                    455/404.2

* cited by examiner

*Primary Examiner* — Joel Ajayi
(74) *Attorney, Agent, or Firm* — RG Patent Consulting, LLC; Rachel Gilboy

(57) ABSTRACT

A mobile application including a computer program designed to run on smartphones, tablet computers, and other mobile devices and allow the user to be directly connected to 911 with exact location information. In use, the user would download an application and be prompted to set-up locations where they are most commonly located. In an emergency, the user would select the "call 911" button, which would pop up the pre-programmed locations. The user would select their location and then the address/phone number information would be transmitted to 911. A button for non-programmed locations would be tied to a GPS system and give a general location of the user. Every 30 days the user would be asked to confirm their pre-programmed locations.

6 Claims, 5 Drawing Sheets

CALL 911 THE APP

CROSS-REFERENCE TO RELATED APPLICATION

The present application is related to and claims priority from prior provisional application Ser. No. 15/236,231, filed Aug. 12, 2016 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of mobile applications (apps) and more specifically relates to the Call 911 The App mobile application.

2. Description of the Related Art

A mobile app is a computer program designed to run on smartphones, tablet computers and other mobile devices. Mobile apps were originally offered for general productivity and information retrieval, including email, calendar, contacts, and stock market and weather information. The explosion in number and variety of apps made discovery a challenge, which in turn led to the creation of a wide range of review, recommendation, and curation sources, including blogs, magazines, and dedicated online app-discovery services. Many new apps are desirable to provide convenient solutions to the users.

When faced with an emergency, it is commonplace to contact emergency services via, for example, dialing 911 from a telephone. However, for 911 or other emergency dispatchers to be most helpful and efficient in assessing an emergent situation and providing the appropriate response to such an emergency, one must be able to continually communicate accurately with the dispatcher. Additionally, to be able to determine where to send help, a dispatcher must possess knowledge of an accurate geographical location of the person in need at the moment of need. Sometimes, during an emergency, individuals do not know the exact location of the emergency and may not have the time or ability to stay connected and clearly convey their circumstances to an emergency responder. Furthermore, in an emergency, individuals often do not have enough time for more than a single call; there is usually not an opportunity to contact family or friends in addition to an emergency responder.

In the past, when individuals utilized mostly landline phones, the location of the caller was, for the most part, known (i.e., the landline phone number from which 911 is contacted can be associated with a fixed physical address). Nowadays, individuals, offices, and other places of business often do not have a landline phone, and even if they do and that landline phone is within reach, they often resort to using their mobile phones to make calls such as a 911 call. When outside the home or office, of course, users are automatically restricted to utilizing their mobile devices. These mobile devices are difficult to assign an emergency response location to ahead of time (as is generally easily done for stationary landline phones), due in part to the fact that a mobile phone holder may be moving across a wide geographic area at any given time. Compounding this can be a scenario in which the person in need of assistance may move or be moved from the location initially reported to emergency personnel.

An additional factor to consider can be that an emergency can be subjective and not all emergencies may require the same response. More specifically, for some situations, which an individual would consider an emergency, the person may wish to contact someone other than the authorities (i.e., police, paramedics, firefighters, etc.) to properly address his or her needs. In some circumstances a user's parents, spouse, other family members or friends may be a more suitable emergency contact. In addition, these non-authority contacts may, in some instances, be able to respond more quickly to an emergency and be able to arrive at the location of the emergency more quickly than the authorities may be able to.

Various attempts have been made to solve the problems which may be found in the related art but have thus far been unsuccessful. A need exists for a reliable Call 911 mobile application to avoid the above-mentioned problems.

BRIEF SUMMARY OF THE INVENTION

In view of the foregoing disadvantages inherent in the known art, the present invention provides a novel mobile app. The general purpose of the present invention, which will be described subsequently in greater detail, is to provide the user of the Call 911 The App mobile application, a simple, user friendly application which allows the user to be directly connected to 911 with exact location information available to verbally or text message to the emergency services dispatcher. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Call 911 The App mobile application, constructed and operative according to the teachings of the present invention.

The various embodiments of the present invention will hereinafter be described in conjunction with the appended drawings.

DETAILED DESCRIPTION

As discussed above, embodiments of the present invention relate to a mobile app and more particularly to Call 911 The App mobile application, creating a functional tangible use for the end-user.

Call 911 The App is a simple, user friendly application which allows the user to be directly connect to 911 either via text message or via mobile phone with exact location information available to the user to provide to emergency services operator.

Figure 5:
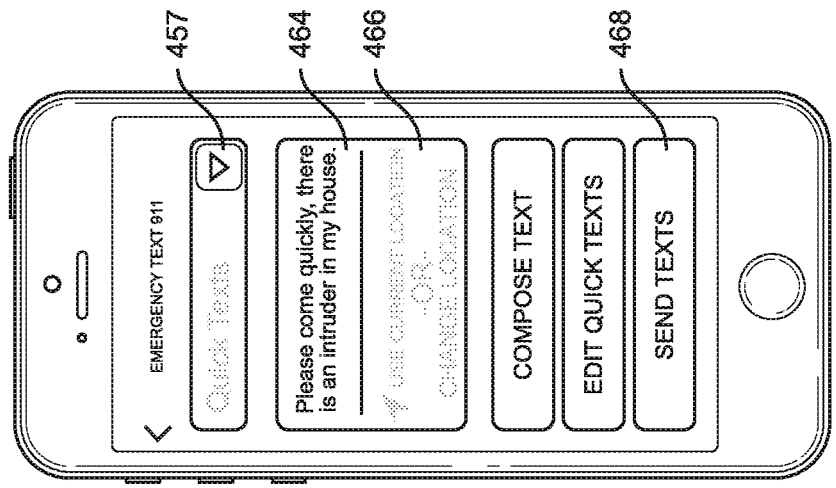
FIG. 5 shows a perspective view illustrating Call 911 The App mobile application according to an embodiment of the present invention.
Figure 4:
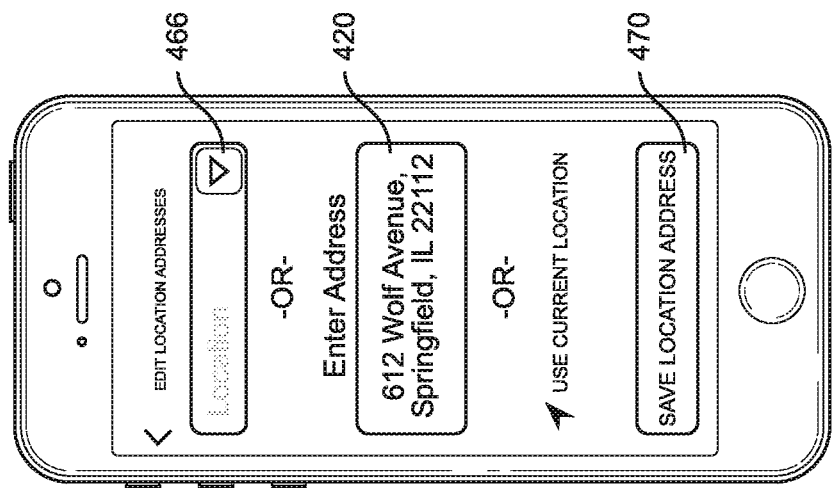
FIG. 4 shows a perspective view illustrating Call 911 The App mobile application according to an embodiment of the present invention.
Figure 3:
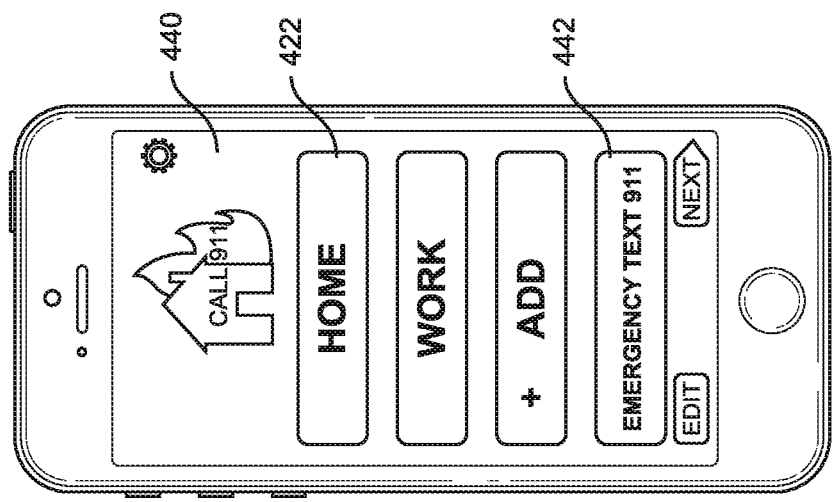
FIG. 3 shows a perspective view illustrating Call 911 The App mobile application according to an embodiment of the present invention.
Figure 8:
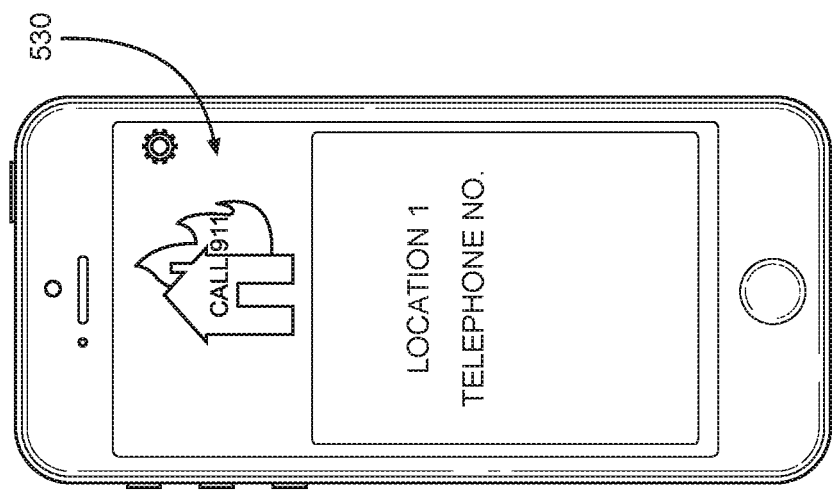
FIG. 8 shows a perspective view illustrating the screen showing location and telephone information of the emergency communication computer application according to an alternate embodiment of the present invention.
Figure 7:
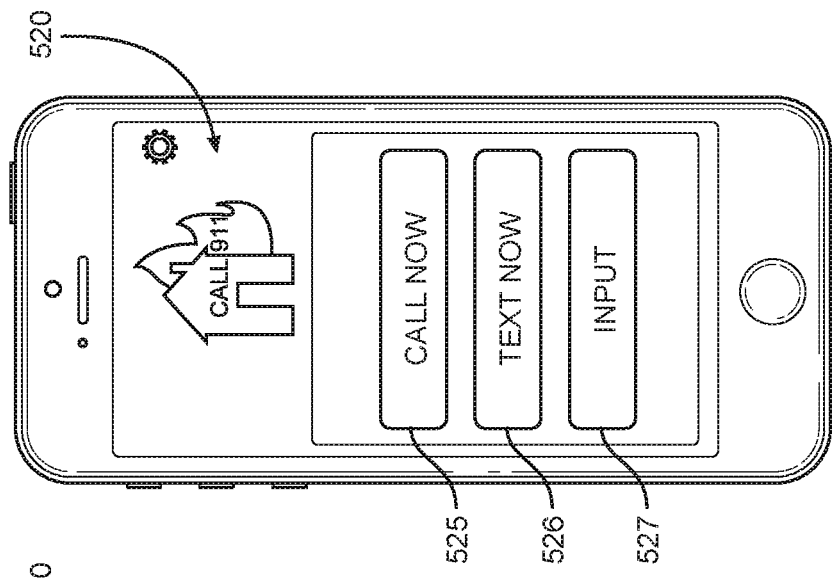
FIG. 7 shows a perspective view illustrating the main page of the emergency communication computer application according to an alternate embodiment of the present invention.
Figure 6:
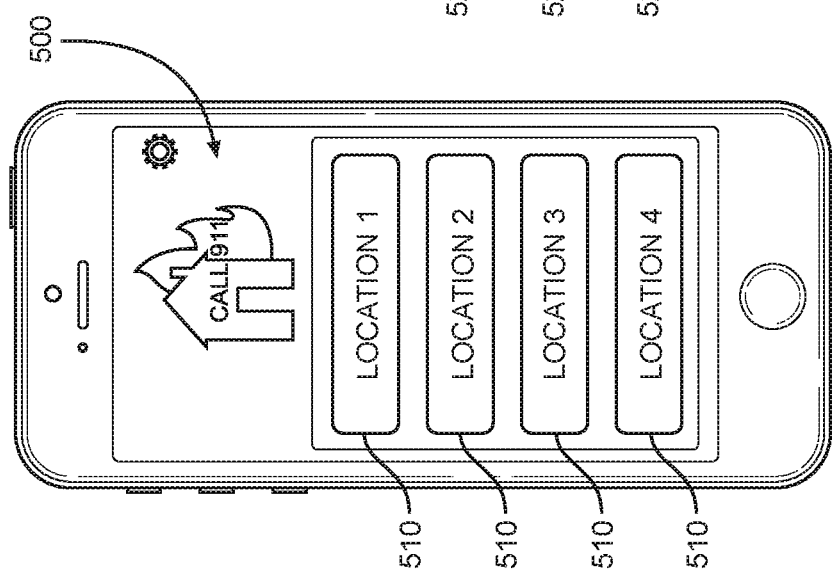
FIG. 6 shows a perspective view illustrating the start page of the emergency communication computer application according to an alternate embodiment of the present invention.
Figure 9:
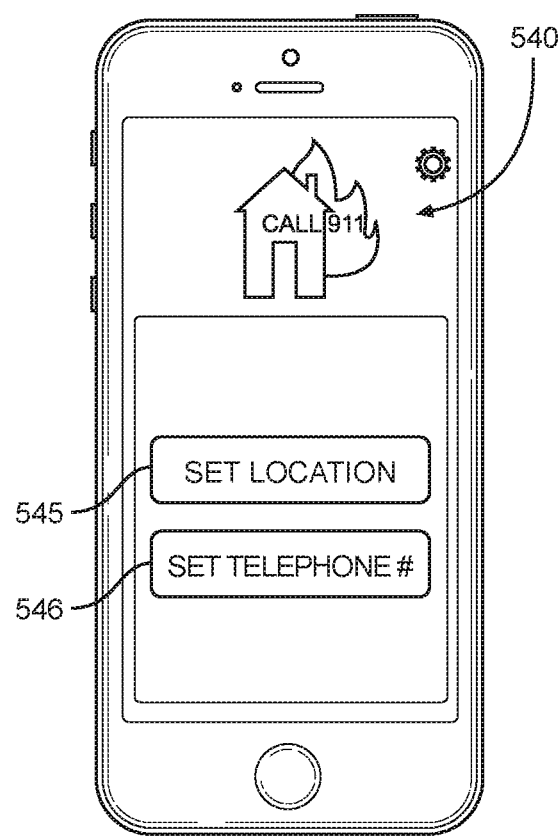
FIG. 9 shows a perspective view illustrating the main input prompting page of the emergency communication computer application according to an alternate embodiment of the present invention.

Referring now to the drawings FIGS. 3-5, showing operation of Call 911 The App mobile application is as follows:
The user would download the app and be prompted to set-up
  3-5 locations where the user is most commonly: home, work, school, and one generic other.
In an emergency, the user would select the "call 911" button,
  which then would pop up the pre-programmed locations.
The user would select his location and the address/phone
  number information would pop up on the screen of the user's mobile device as the phone call goes through. The user would provide location and additional and important information to the emergency services operator.
The other button for non-programmed location would be
  tied to a GPS and give a general location.
Every 30 days the user would be programmed to confirm his
  pre-programmed locations. Call 911 The App has a call mode which allow the user to set Call 911 The App to test mode as the user turns on the mobile application to avoid calling or texting emergency services during non-emergencies. Call 911 The App defaults to live mode after initial set-up.
The unique features of this application will provide the following benefits for all users:
This app can save lives.
The app provides information that might not be readily
  available in times of stress.
The app provides information that might not be readily
  available in times of stress.
This app eliminates the need for a landline in the home.

Figure 1:
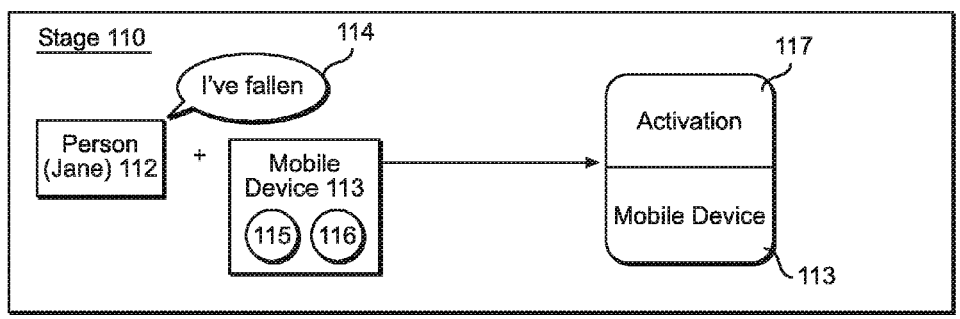
FIG. 1 is a schematic diagram illustrating an implementation of an emergency communication mobile application in accordance with embodiments of the inventive arrangements disclosed herein.
Figure 1:
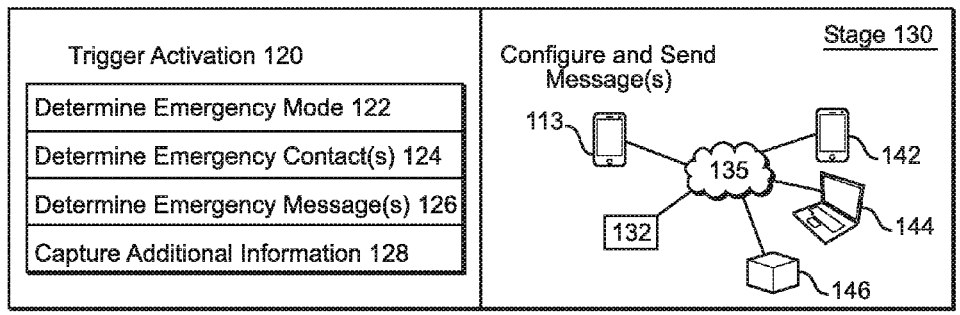
Figure 1:
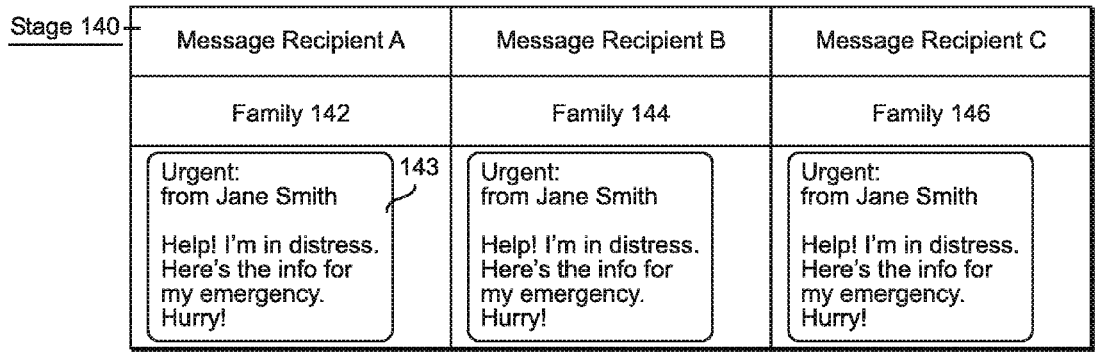
Figure 1:
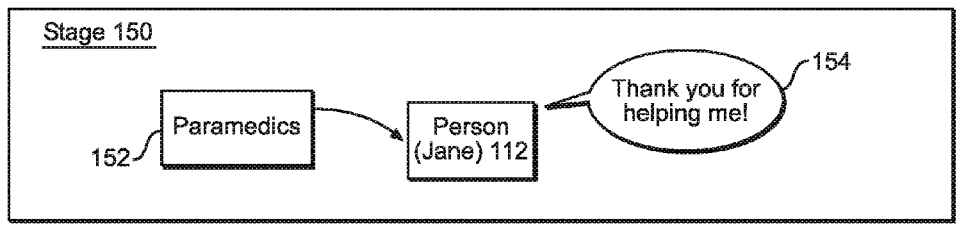

FIG. 1 is an illustration of an implementation 100 of an emergency communication mobile application with stages 110, 120, 130, 140 and 150 in accordance with embodiments of the inventive arrangements disclosed herein. Stages 110 through 150 are for illustrative purposes only, and are not meant to be interpreted as an absolute implementation or limitation of an embodiment of the present disclosure.

In stage 110, a person (Jane) 112 is in an emergency situation 114. For example, Jane has fallen and cannot get help herself. Jane, however, has access to a mobile device 113 with the emergency communications application 115, which she can instantly activate with an activation pin, pattern or button 116. After activation 117 Jane need not do anything more than wait for help to arrive.

Activation patterns can be user-specific and cover a variety of hardware/software input mechanisms. For example, Jane can have set up the application to allow her to press the volume button for 5 seconds continually to auto-activate a 911 emergency mode. In one embodiment, a set of conditions (e.g., entry/exit of the position of the device 113 from a predetermined geographic region as compared against a set of GPS coordinates; existence of a characteristic sound like breaking glass or the phone user screaming "help" in a certain decibel range as determined from a microphone of the mobile device 113; lack of movement towards an expected destination as determined from a calendar entry, clock, and GPS position; characteristic shaking pattern of the phone as detected by accelerometers; and the like) can be defined by a user and compared against parameters/conditions of the mobile device 113, where established logic determines whether an activation 117 occurs.

In stage 120, or trigger activation 120 stage, the application can determine the specific emergency mode 122 activated. It can then, in one embodiment, communicate with the server 132 to determine one or more emergency contacts 124 which will receive an emergency message and which communications method the message will be conveyed by (for example, text, IM, voice, email, etc.). In one instance, the application can utilize the mobile device GPS feature to locate and trace mobile phone contacts' locations (when these contacts have previously allowed tracing), and can utilize the geographically most proximate contacts in addition to or in lieu of preconfigured emergency contacts, thus potentially increasing the probability of first response. Additionally, emergency messages can be sent to other application users' devices within a predetermined geographic radius to alert the users of an emergency occurring in their proximity so they can either avoid the area or respond to the emergency situation.

Additionally, When interfacing with the server 132, the application can determine the specific emergency message(s) 126 to send to the determined one or more emergency contacts (or other defined recipient). Optionally, the application can also trigger other mobile phone applications to capture additional information 128. For example, in one embodiment, the application can activate the device's GPS to record the mobile device's location; this GPS tracking can occur even prior to user activation of an emergency mode to continually track a user from the server and have pre-emergency information available in an emergency situation. In another embodiment, the application can signal the phone's camera to snap a still image or video clip to be included with the emergency message. These activated and captured images, sounds, positions, etc. can be periodically conveyed to the set of people who received the emergency message(s). Different messages and/or captured input can be sent to different ones of the emergency contacts.

During stage 140 emergency contacts (message recipients A, B, and C) receive notifications. For example, one notification can be sent to Jane's family's cellphone and include message 143 with attachments. Another emergency notification can be sent to Jane's neighbor and friend 144 and include message 145. In this instance, message 145 can be different from message 143 as preconfigured by Jane. Yet another emergency message can be sent directly to authority emergency contacts such as paramedics 146. Paramedics 146 can receive the same message as Jane's neighbor/friend.

Stage 150 shows that responsive to having received an emergency notification from Jane her emergency contacts can respond by arriving at her location to provide help. In this instance, the paramedics 152 can arrive at person (Jane) 112's location first. Instead of remaining in danger Jane is helped and her emergency can be resolved 154.

Figure 2:
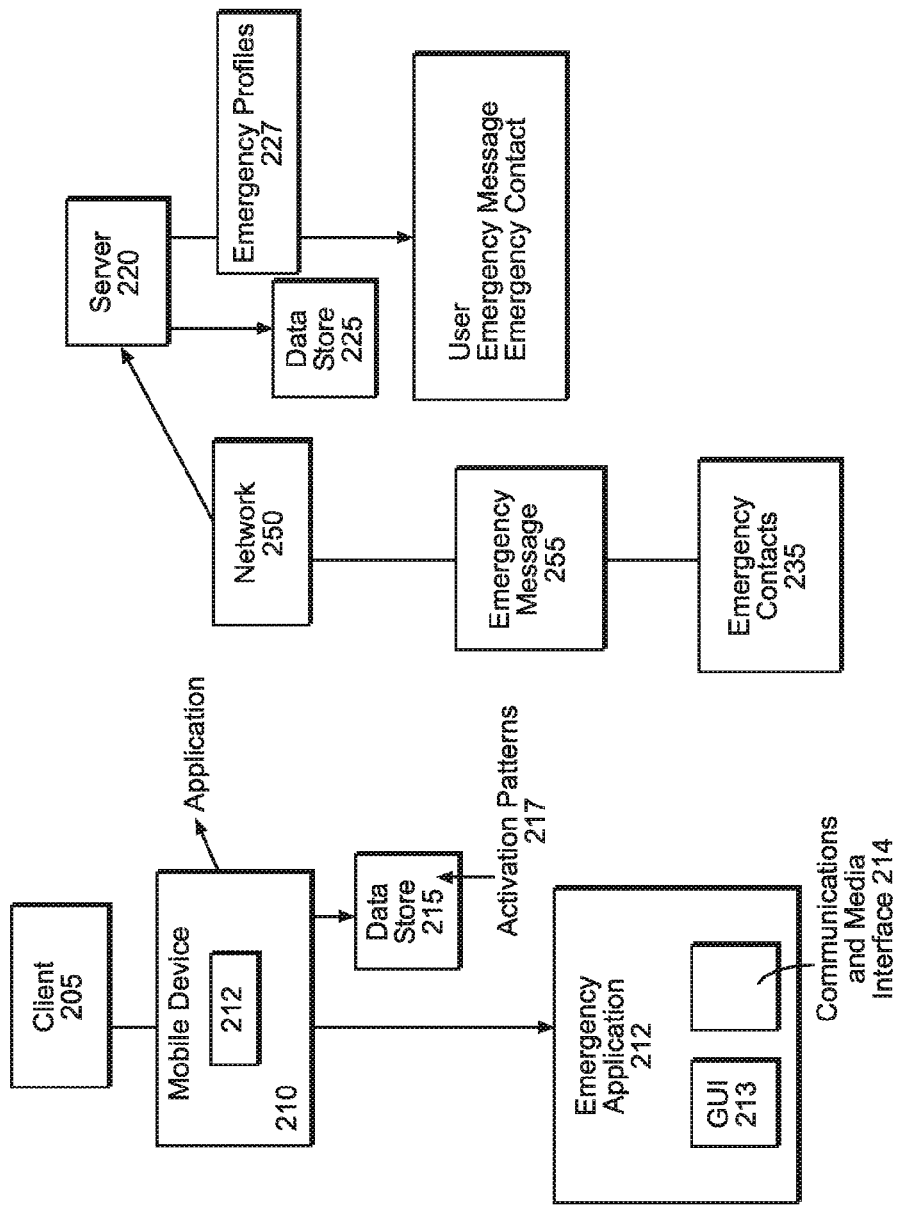
FIG. 2 is a schematic diagram illustrating a system that automatically communicates emergency messages to one or more emergency contacts in accordance with embodiments of the inventive arrangements disclosed herein.

FIG. 2 is a schematic diagram illustrating a system 200 that automatically communicates emergency messages to one or more emergency contacts in accordance with embodiments of the inventive arrangements disclosed herein. The system 200 can include a client 205, a mobile device 210, a server 220, emergency contacts 235 and network 250. System 200 and its components can be configured to configure, send and properly route emergency messages 255. It should be noted that the components illustrated within the system 200 are for illustrative purposes only, and are not meant to be interpreted as an absolute implementation or limitation of an embodiment of the present disclosure.

Client 205 can utilize mobile device 210 to utilize the application 212 in order to automatically send one or more emergency notifications to one or more emergency contacts. Mobile device 210 can include application 212, and data store 215 containing activation patterns 217. Activation patterns can be configured by the user 205 to auto-activate various emergency profiles within application 212, activation patterns can be, for example, a hardware button to be pressed, a pin or password to be entered or a specific unlock pattern for the phone home screen, device shake activation, and the like. Additional activation patterns 217 are contemplated.

The emergency application 212 can include one or more graphical user interfaces (GUIs) 213, and a communications and media interface 214. A GUI 213 can represent the interaction mechanism by which a user can perform functions with and/or enter data into application 212. Multiple GUIs 213 can exist, each presenting different data and/or functionality. The quantity of GUIs 213 and/or their configuration can depend upon the design and implementation of the emergency communications application 212.

Server 220 can include data store 225, which can contain emergency profiles 227. In one embodiment, data store 225 can also contain user preferences for attachments and the like. Emergency profiles 227 can include information on user preconfigured emergency modes, emergency messages for the preconfigured emergency modes and emergency contacts for the preconfigured emergency modes. Emergency contacts can be authority (i.e., police, paramedics, firefighters, etc.) and non-authority contacts. The non-authority contacts can be notified in lieu of or in addition to the authorities.

When activated, the application 212 can, in one embodiment, communicate with server 220 to determine the specific emergency messages to send to the specific emergency contacts. Additionally, the application 212 in conjunction with the server 220 can establish what, if any, type of attachments to include in the emergency message 255 to be sent to emergency contacts 235. As previously mentioned, attachments can include GPS location of the device 210, and by extension the client 205, a still image, video, or audio recording, and the like. It should be understood that communication with the server 220 is not necessary to implement an instance of the disclosure and information such as emergency contacts, emergency messages to send, attachment preferences, and the like, can in another embodiment be stored on the mobile phone's storage device itself.

Network 135, 250 can include any hardware/software/and firmware necessary to convey data encoded within carrier waves. Data can be contained within analog or digital signals and conveyed through data or voice channels. Network 135, 250 can include local components and data pathways necessary for communications to be exchanged among computing device components and between integrated device components and peripheral devices. Network 135, 250 can also include network equipment, such as routers, data lines, hubs, and intermediary servers which together form a data network, such as the Internet. Network 135, 250 can also include circuit-based communication components and mobile communication components, such as telephony switches, modems, cellular communication towers, and the like. Network 135, 250 can include line based and/or wireless communication pathways.

As used herein, presented data stores 215 and 225 can be a physical or virtual storage space configured to store digital information. Data stores 215 and 225 can be physically implemented within any type of hardware including, but not limited to, a magnetic disk, an optical disk, a semiconductor memory, a digitally encoded plastic memory, a holographic memory, or any other recording medium. Data stores 215 and 225 can be a stand-alone storage unit as well as a storage unit formed from a plurality of physical devices. Additionally, information can be stored within data stores 215 and 225 in a variety of manners. For example, information can be stored within a database structure or can be stored within one or more files of a file storage system, where each file may or may not be indexed for information searching purposes. Further, data stores 215 and/or 225 can utilize one or more encryption mechanisms to protect stored information from unauthorized access.

FIGS. 3, 4 and 5 present mobile device graphical user interfaces (GUIs) illustrating a sample implementation of the management application in accordance with an embodiment of the inventive arrangements disclosed herein. It should be appreciated that the GUIs are for illustrative purposes only, and that additional configurations and functionalities can be incorporated without diverging from this embodiment of the present invention.

In FIGS. 3 and 4, emergency contact configuration interface 420 can allow the user to enter email addresses for emergency message or notification recipients in emergency contact data 422 fields. In another embodiment, additional contact configuration interfaces 420 can include an interface for IM contacts, voice contacts, video chat, and the like. When launching the activation menu 440, the user can be presented with a GUI for selecting to activate various emergency profiles 442.

FIGS. 4 and 5 is a GUI from an emergency message recipient's viewpoint in accordance with an embodiment of the inventive arrangements disclosed herein. Emergency notification 457 and location tracking GUI 470 are displayed on the emergency contact mobile device 458. Emergency notification 457 can include the emergency message text 464 and links or embedded images of the various attachments 466, 468 included with the emergency message 464. Attachment 466 can be a link to the emergency message sender's GPS location 466. Additional information attachment 468 can include a still image, a video recording, an audio recording, and the like.

In FIGS. 6-9, an alternate embodiment incorporates an emergency communication computer application for use with a mobile communications device for providing emergency communications, wherein the emergency communication computer application provides a start page 500 that includes a list of locations 510, wherein one location is chosen by the user, information of the location is retrieved, and then then the application forwards to a main page 520. The main page 520 includes a call-now option 525 adapted to connect the mobile communications device with an emergency operator, and wherein the location and an associated phone number of the mobile communications device will appear on the screen 530 of the mobile communications device, such that the user can read and tell the emergency operator the location and phone number they are located at; a text-now option 526 adapted to send a text to an emergency operator that includes the location and an associated phone number of the mobile communications device; and a main input prompting page option 527, wherein when selected forwards to a main input prompting page 540. The main input prompting page 540 includes a location input option 545 for inputting location information for a plurality of locations the mobile communications device may be located at; and a telephone input option 546 for inputting at least one telephone contact number for each respective location. The emergency communication computer application is adapted to be run on the mobile communications device and facilitate information exchanges between the user of the mobile communications device and an emergency operator.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An emergency communication computer application for use with a mobile communications device for providing emergency communications, wherein said emergency communication computer application provides:
   an activation menu including:
      a home option adapted to allow said user to input a home address;
      a work option adapted to allow said user to input a work address;
      an add option adapted to allow said user to input an additional address each time chosen;
      wherein said activation menu is adapted to prompt and enable a user to individually input information for each said home, work, and additional location the user is most commonly located at and thereby pre-program said emergency communication computer application and form a list of locations to be accessed;
   a start page including:
      said list of locations adapted to be projected upon a screen of said mobile communications device;
         wherein one location of said list of locations can be chosen;
      wherein said start page is adapted to forward to a main page for said location chosen after said location is chosen and information of said location is retrieved;
   a main page for said location chosen including:
      a call-now option;
         wherein when selected said call-now option is adapted to connect said mobile communications device with an emergency operator, and wherein said location of said mobile communications device and an associated phone number will appear on a screen of said mobile communications device, such that a user can read and tell said emergency operator said location and phone number they are located at;
      a text-now option;
         wherein when selected said text-now option is adapted to send a text to an emergency operator that includes said location and an associated phone number of said mobile communications device; and
      a main input prompting page option;
         wherein when selected said main input prompting page option is adapted to forward to a main input prompting page for inputting information for additional locations; and
   a main input prompting page including:
      a location input option for inputting location information of an additional location said mobile communications device may be located at; and
      a telephone input option for inputting at least one telephone contact number said additional location;
   wherein said emergency communication computer application is adapted to be run on said mobile communications device and facilitate information exchanges between said user of said mobile communications device and an emergency operator;
   wherein said emergency communication computer application is adapted to prompt said user to confirm or update said information for each said home, work, and additional location pre-programmed therein; and
   wherein said emergency communication computer application includes a call mode adapted to allow said user to enter a test mode as the user turns on the emergency communication computer application to avoid calling or texting emergency services during non-emergencies, and which automatically switches to a live mode after initial set-up and pre-programming.

2. The emergency communication computer application of claim 1, further adapted to receive Global Positioning Satellite (GPS) information of the location of said mobile communications device and used to add said location information to said call-now option.

3. The emergency communication computer application of claim 1, further adapted to receive Global Positioning Satellite (GPS) information of the location of said mobile communications device and used to add said location information to said text-now option.

4. An improved mobile communications device comprising:
   a main body including:
      an interior volume;
      a screen;
         wherein said screen is attached to an outer surface of said main body and includes touch-screen technology;
      at least one processor;
         wherein said processor is located within said interior volume;
      at least one transceiver;
         wherein said processor is located within said interior volume; and an emergency communication computer application;
wherein said emergency communication computer application is adapted to be run on said processor and facilitate information exchanges between said user of said mobile communications device and an emergency operator, wherein said emergency communication computer application provides:
an activation menu including:
a home option adapted to allow said user to input a home address;
a work option adapted to allow said user to input a work address;
an add option adapted to allow said user to input an additional address each time chosen;
wherein said activation menu is adapted to prompt and enable a user to individually input information for each said home, work, and additional location the user is most commonly located at and thereby pre-program said emergency communication computer application and form a list of locations to be accessed;
a start page including:
said list of locations adapted to be projected upon a screen of said mobile communications device;
wherein one location of said list of locations can be chosen;
wherein said start page is adapted to forward to a main page for said location chosen after said location is chosen and information of said location is retrieved;
a main page for said location chosen including:
a call-now option;
wherein when selected said call-now option is adapted to connect said mobile communications device with an emergency operator, and wherein said location of said mobile communications device and an associated phone number will appear on a screen of said mobile communications device, such that a user can read and tell said emergency operator said location and phone number they are located at;
a text-now option;
wherein when selected said text-now option is adapted to send a text to an emergency operator that includes said location and an associated phone number of said mobile communications device; and
a main input prompting page option;
wherein when selected said main input prompting page option is adapted to forward to a main input prompting page for inputting information for additional locations; and
a main input prompting page including:
a location input option for inputting location information of an additional locations said mobile communications device may be located at; and
a telephone input option for inputting at least one telephone contact number said additional location;
wherein said emergency communication computer application is adapted to be run on said mobile communications device and facilitate information exchanges between said user of said mobile communications device and an emergency operator;
wherein said emergency communication computer application is adapted to prompt said user to confirm or update said information for each said home, work, and additional location pre-programmed therein; and
wherein said emergency communication computer application includes a call mode adapted to allow said user to enter a test mode as the user turns on the emergency communication computer application to avoid calling or texting emergency services during non-emergencies, and which automatically switches to a live mode after initial set-up and pre-programming.

5. The emergency communication computer application of claim 4, further adapted to receive Global Positioning Satellite (GPS) information of the location of said mobile communications device and used to add said location information to said call-now option.

6. The emergency communication computer application of claim 4, further adapted to receive Global Positioning Satellite (GPS) information of the location of said mobile communications device and used to add said location information to said text-now option.

* * * * *